(12) United States Patent
German et al.

(10) Patent No.: US 6,501,897 B1
(45) Date of Patent: Dec. 31, 2002

(54) OVERLAY FOR TELECOMMUNICATIONS DISTRIBUTION FRAME

(75) Inventors: Michael G. German, Secaucus, NJ (US); Mark Richard Jennings, Andover, NJ (US); Frank S. Leone, Berkeley Heights, NJ (US); Richard J. Pimpinella, Hampton, NJ (US)

(73) Assignee: Fitel USA Corp., Norcross, GA (US)

( * ) Notice: Subject to any disclaimer, the term of this patent is extended or adjusted under 35 U.S.C. 154(b) by 56 days.

(21) Appl. No.: 09/657,965

(22) Filed: Sep. 8, 2000

(51) Int. Cl.$^7$ ................................................. G02B 6/10
(52) U.S. Cl. ........................ 385/134; 385/135; 385/24; 385/39; 324/66; 361/826
(58) Field of Search ................................ 385/134, 135, 385/147, 15, 24, 31, 39; 359/110, 111, 154, 155, 163; 324/66; 361/826, 827; 379/25

(56) References Cited

U.S. PATENT DOCUMENTS 5,448,675 A * 9/1995 Lene et al. ................. 385/135
5,461,693 A * 10/1995 Pimpinella ................. 385/135

* cited by examiner

Primary Examiner—Huy Mai
(74) Attorney, Agent, or Firm—Eli Weiss

(57) ABSTRACT

The present invention is a flexible plastic membrane which supports embedded components such as light emitting diodes and plastic pressure switches, and conductors on a plastic ribbon which connects the embedded light emitting diode and plastic pressure switch to a connector. The flexible plastic membrane supports an adhesive which enables it to be stick to the surface of the module face plate. The inventive structure is more economical to build and install than presently used mechanical spring loaded push switches and light emitting diodes as they must be physically mounted to the face plate and hardwired when the module is manufactured. In addition, the inventive structure can be replaced in the field when a fault develops without disturbing or disconnecting the optical fiber connected to the front or rear of a module.

6 Claims, 4 Drawing Sheets

OVERLAY FOR TELECOMMUNICATIONS DISTRIBUTION FRAME

BACKGROUND OF THE INVENTION

1. Field of the Invention

The present invention relates to an overlay having embedded components for attachment to a telecommunication optical fiber distribution frame.

2. Description of the Prior Art

Optical fiber distribution frames typically serve the function of cross-connecting incoming optical fiber cables to customer transmission equipment. A frame typically includes a multiplicity of shelves, where each shelf includes a plurality of modules selectively connected to the ends of optical fiber cables. Cross connect jumper cables (also known as patch cords) are applied in the front of modules to selectively cross-connect optical fibers.

There is currently deployed in telecommunication central offices and other facilities many millions of optical fiber jumper cross connects on optical fiber cross connect frames. These frames generate millions of dollars of revenues. Modifications to the frames by adding, repositioning or removing patch cords must be done without any service disruptions associated with the process. Needless to say, this is not accomplished easily or carelessly. Obviously, to provide uninterrupted service which is necessary to protect the revenue stream, telecommunications service providers jealously protect their service carrying fibers from all forms of interruption. The great majority of modules contain multiple optical fiber connectors mounted on face plates of plastic or metal. Patch cords are used to interconnect the optical fibers. On equipment which is currently deployed in the field, the faceplates have labels which identify each fiber.

One of the problems that exist at customer locations is accureatly keeping track of the connectivity of the jumpers at that location. Without accurate databasing, it is difficult to determine where the ends of each optical patch cord are connected. Frequently, to satisfy a customer's changing business needs, optical patch cords must be rearranged, added and/or removed. The identification of the various optical patch cords, and of the optical fibers to which they are connected are most often recorded manually in either a paper log book or in a computer database. However, technicians sometimes neglect to update the database each time a change is made. Inevitably, the database is less than 100% accurate and a technician has no way of accurately identifying the optical fiber jumper ends. Accordingly, when a technician needs to change an optical patch cord, the technician must manually trace that patch cord between the two connector ports. To perform a manual trace, the technician first locates an end of a patch cord and then manually follows the patch cord to the opposite end. One of the problems which exists is the high density of optical connections, typically 72–144 connections per shelf. The great number of cross connections and optical trough congestion makes it difficult to accurately trace a patch cord. Clearly, not only does it take a significant amount of time for a technician to manually trace a particular patch cord, but the process is error prone. Technicians can accidentally go from one patch cord to another during a manual trace which may result in finding an incorrect end. To facilitate the tracing of the fiber connections, mechanical push button switches and light emitting diodes are mounted in the face plate of each module, and hardwired to a host computer. The face plate supports a permanently mounted mechanical spring loaded push button switch and a light emitting diode for each connector port or jack. A host computer has stored therein the optical connectivity of each jumper on the frame. When a craftsperson desires to optically cross-connect two optical connector ports, he or she presses a push button switch on the face of the module associated with each port. Depression of the push button switch signals the computer to indicate where the jumpers are connected. Two light emitting diodes associated with the two connector ports that are to be interconnected light up (see, e.g., U.S. Pat. No. 5,448,675 issued to Leone).

One of the problems which exists is the relatively high cost of installing and hardwiring the mechanical push button switches and light emitting diodes assemblies into a module. Another problem is that of having to physically remove a module and thus, cause an interruption of service when a mechanical push button switch becomes inoperative or the connecting conductors develop a fault.

It is desirable to provide a more economical structure for identifying connector ports or jacks and, in addition, to provide a structure for identifying connector ports which can be replaced or initially installed without causing an interruption of service.

SUMMARY OF THE INVENTION

The present invention is a flexible plastic membrane which supports embedded components such as light emitting diodes, plastic pressure switches, and conductors on a plastic ribbon which connects the embedded light emitting diode and plastic pressure switch to a connector. The flexible plastic membrane supports an adhesive which enables it to be stick to the surface of the module face plate. The inventive structure is more economical to build and install than presently used mechanical spring loaded push switches and light emitting diodes as they must be physically mounted to the face plate and hardwired when the module is manufactured. In addition, the inventive structure can be replaced in the field when a fault develops without disturbing or disconnecting the optical fiber connected to the front or rear of a module.

BRIEF DESCRIPTION OF THE DRAWINGS

A more complete understanding of the method of the present invention may be obtained by reference to the following detailed description of the preferred embodiments that follow, taken in conjunction with the accompanying drawings, wherein.

DETAILED DESCRIPTION

Figure 1:
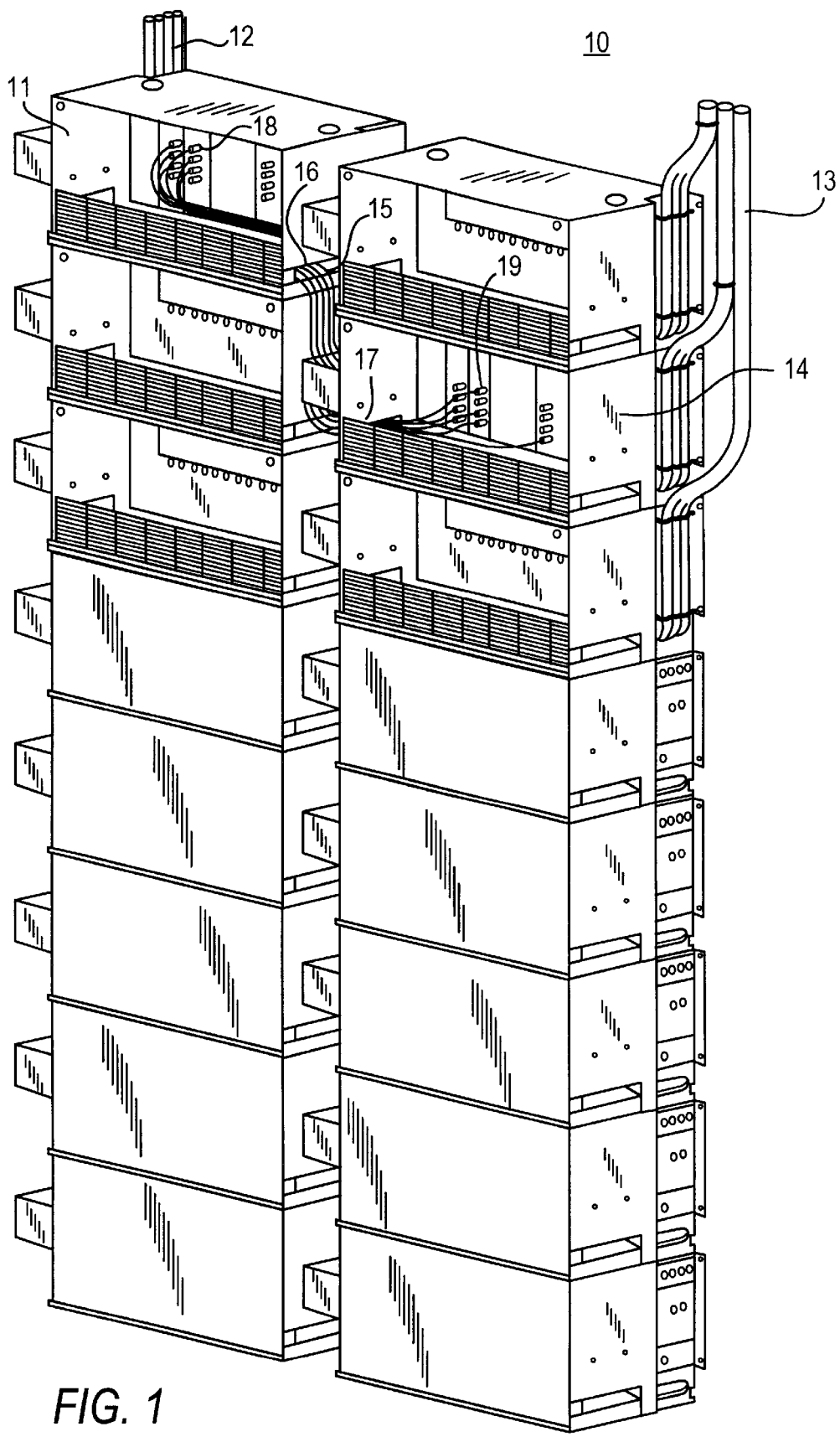
FIG. 1 is a perspective view of a fiber distribution frame including the invention in accordance with one embodiment.

FIG. 1 illustrates a typical fiber distribution frame 10 which may utilize the invention. The frame includes a plurality of shelves, e.g., 11 and 14, arranged in two columns in this example. Each shelf includes a plurality of modules, e.g., 18 and 19, where optical fibers from a trunk cable 12, or transmission cable 13, are connected with optical fiber patch cords, e.g., 15, for purposes of making a cross-connection between cables. Typically, the trunk cable 12 or transmission cable 13 is brought into the frame at the back and fibers from the cable are introduced into each module through an aperture which can be located at the front or rear of the shelves. In this example, all fiber cross-connections are made in the front of the module.

For purposes of illustration, the doors of the top three shelves in each column have been removed. Again, for purposes of illustration, a set of patch cords 15 are shown connected from shelf (e.g., module 18) through aperture 16 to shelf 14 (e.g., module 19) through aperture 17. Of course, any fiber from trunk cable 12 can be connected with any fiber from the transmission cable 13 through an appropriate patch cord connection. In this example, each of the shelves in the left-hand column has access to the trunk cable and each of the shelves in the right-hand column has access to the transmission cable, but other arrangements are possible. It will be appreciated that the invention is also applicable for frames providing connections other than optical connections between cables (e.g., electrical).

Figure 2:
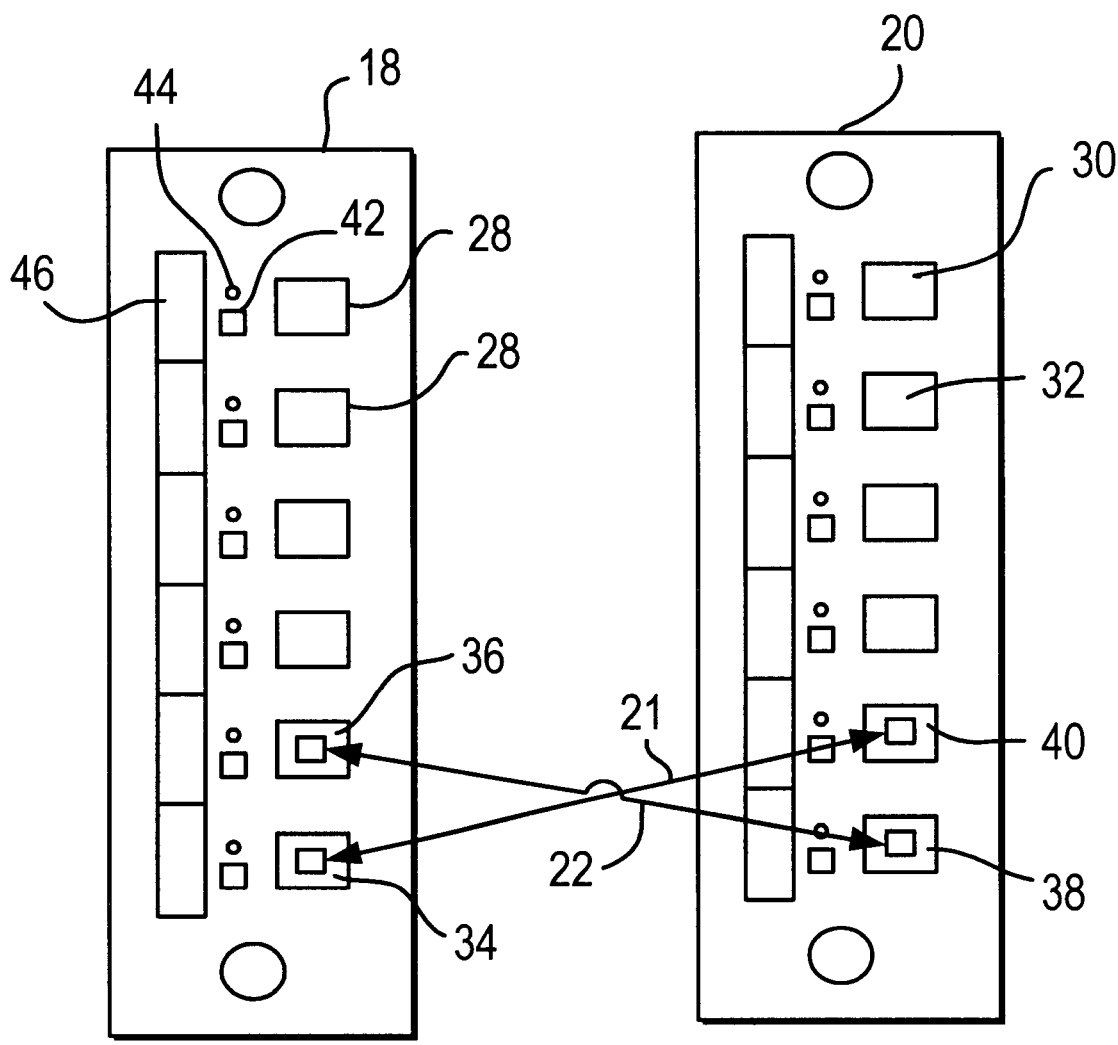
FIG. 2 is a detailed view of the face plate of two prior art modules which are part of the fiber distribution frame of FIG. 1 illustrating the use of labels, light emitting diodes and mechanical push switches mounted directly to the face plate of a module.

Referring to FIG. 2, there is illustrated a view of the face plate of two prior art modules 18, 20 which are part of the fiber distribution frame of FIG. 1 which are to be optically connected by patch cords 22, 24. Each module can support six, eight or twelve jacks. The module of FIG. 2 is a six jack module. A pair of jacks 26, 28 and 30, 32 on face plates 18, 20 are adapted to receive standard optical connectors attached to a pair of fibers (not shown) from the trunk cable 12 in the case of module 18 or transmission cable 13 in the case of module 20. One of the jacks 28, 32 is adapted to receive optical signals from a respective cable, and the other jack 26, 30 is adapted to transmit optical signals to its respective cable. Each module also includes a pair of jacks 34, 36 and 38, 40 for optically connecting the two modules. As illustrated by the arrows, jack 34 of module 18 is optically coupled to jack 40 of module 20, while jack 36 of module 18 is optically coupled to jack 38 of module 20. Thus, plugging a patch cord into the appropriate jacks of modules 18, 20 will provide the necessary cross-connections between a pair of fibers from a central office (cable 12) and a pair of fibers coupled to a customer's equipment (cable 13).

Referring to typical face plate 18 of a module, adjacent to jack 26 there is located a normally open mechanical spring loaded push switch 42, an indicator light 44 which may be a light emitting diode (LED) and a paper overlay 46. Switch 42 is a mechanical tracing button which, when depressed, will instruct the computer to close a circuit to energize LED 44 and another LED to indicate the location for the two jacks that are to be connected by a common patch cord. The paper overlay is provided to receive a notation by the technician of the source or identification for the optical fiber connected to jack 26.

The tracing buttons and light emitting diodes are provided to facilitate the positioning of jumper cables because of the high density of modules and patch cords which often makes it difficult to find the appropriate jacks on the correct modules which are to be connected.

The present invention is a plastic membrane containing embedded light emitting diodes and integral plastic pressure switches electrically coupled to a connector via conductors supported by a flat flexible plastic ribbon. The inventive plastic membrane containing the embedded LED's and integral pressure switches is a new improved and more economical structure for use with prior art modules which provides the following improvements and advantages:

(A) A structure that is more economical to manufacture and install than the current structure which uses mechanical tracing buttons and LED's which must be mechanically connected to the face plate of the module and hardwired to a connector mounted on the module;

(B) A structure that is not dependent on jumper connector type or jumper plate configuration;

(C) A structure that is field installable using local technical personnel; and (D) A structure that is replaceable in the field without disturbing or disconnecting in use optical fibers on the front or rear of the modules.

Figure 3:
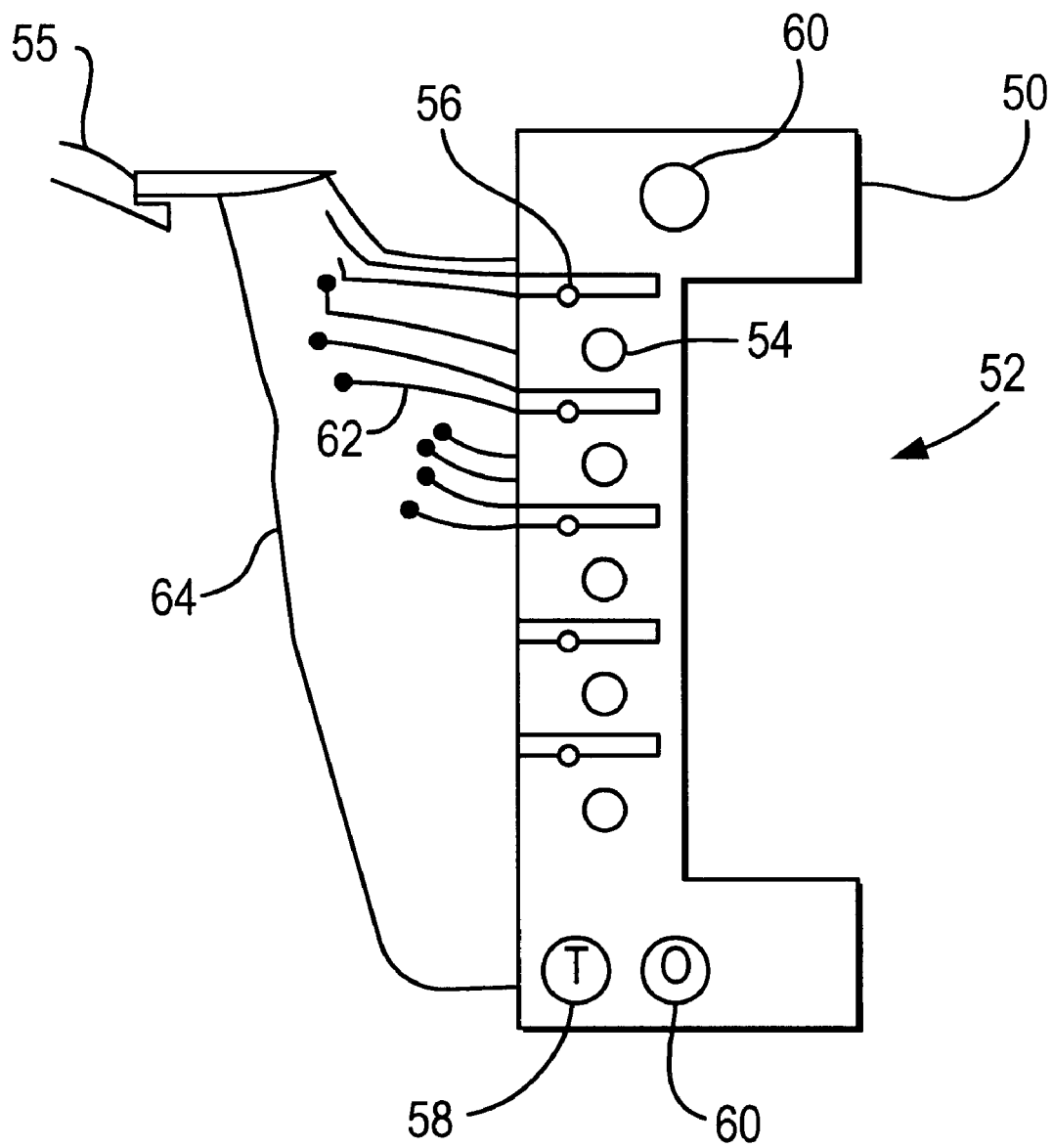
FIG. 3 is a detailed view of a plastic membrane overlay containing embedded light emitting diodes, plastic pressure switches and conductors on a flat plastic ribbon for attachment, by adhesive, to the front of a prior art module in accordance with the principles of the invention.

Referring to FIG. 3, a thin flexible plastic member or membrane 50 is configured to be applied to the face of a module having jacks connected to the ends of optical fibers. The membrane 50 supports at least one cutout 52 sized to permit jacks coupled to the face plate of a module to be exposed. Current prior art modules support six, eight or twelve optical fiber jacks on the face plate. The membrane 50 of FIG. 3 is for application to a module that supports six optical fiber jacks. For each jack on the module there is a corresponding LED and plastic pressure switch. Thus, for a module having six optical fiber jacks, the membrane 50 will support six integral plastic pressure switches 54 and six LED's 56, where each one of the plastic pressure switches and LED's on the membrane is positioned to be in alignment with one of the optical jacks when the membrane 50 is affixed to the face of a module. The membrane 50 can also support a test plastic pressure switch 58. The plastic pressure switches can be a normally open electrical circuit which assumes a closed or conducting state when a person applies finger pressure to the switch. The cost of manufacturing an integral plastic pressure switch within the membrane is considerably less than the cost of manufacturing, mounting and wiring a mechanical switch. Openings 60 in the membrane 50 provide clearance for projecting pins which may be present on the face of the module. To distinguish the plastic pressure switches form the surrounding plastic material, the top surface of the pressure switch can be of a contrasting color such as blue where the surrounding plastic material can be a pale gray or off white.

Each plastic pressure switch 54 and LED 56 is connected to a flexible conductor 62 which extends along a flexible plastic ribbon 64 to a terminal 66. The flexible plastic ribbon 64 is sufficiently thin and flexible to permit it to be positioned between adjacent modules and the attached conductors can be electrically insulated to prevent the conductors from making electrical contact with a module or the like.

Figure 4:
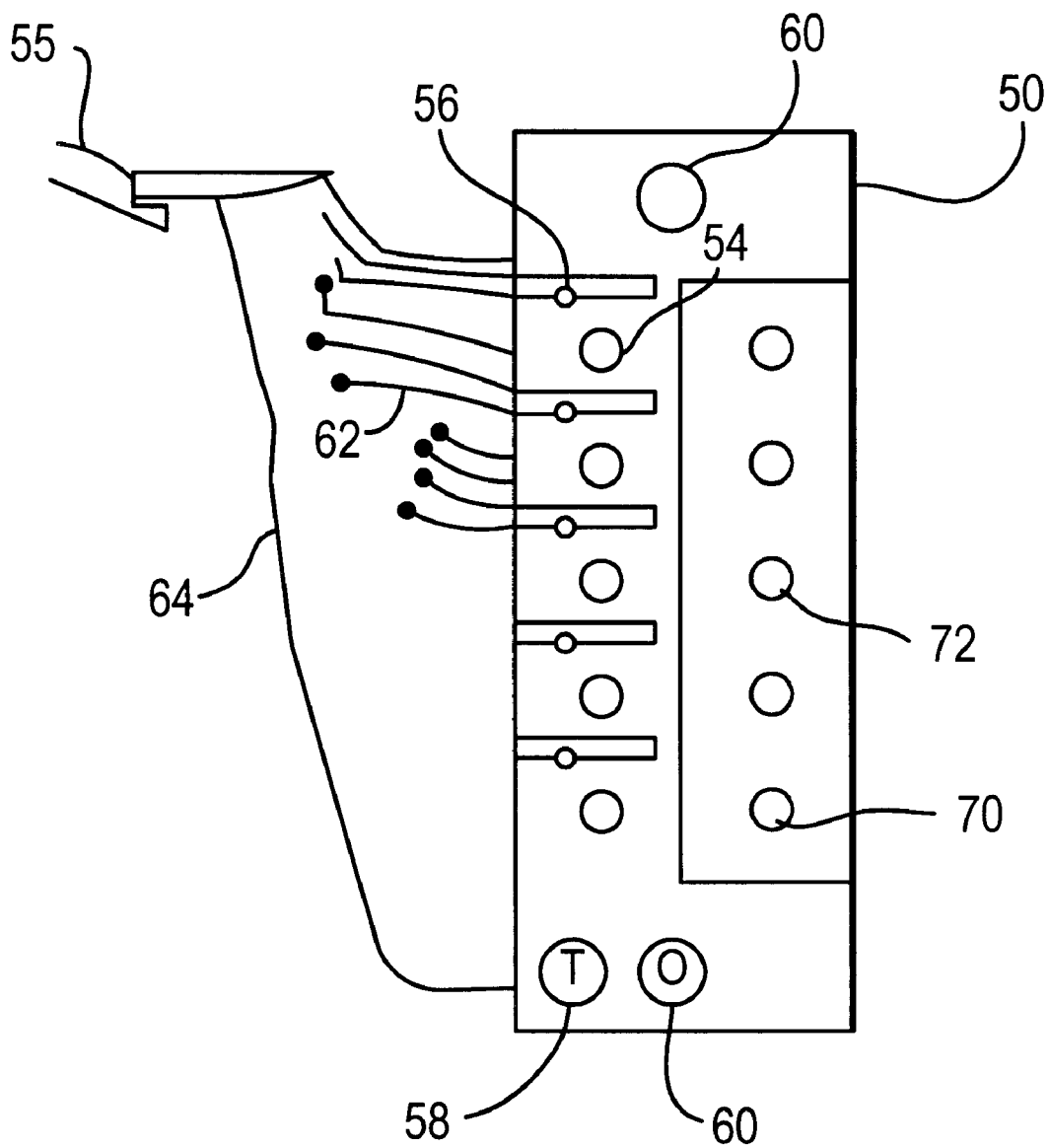
FIG. 4 is a detailed view of the inventive plastic membrane overlay attached to the face of a module.

In operation, the plastic membrane 50 is pressed onto the face plate of a module. The back surface of membrane 50 supports an adhesive which holds the membrane 50 securely to the face of the module. Referring to FIG. 4, there is illustrated a view of the inventive membrane overlay 50 attached to the face of a module 70. The adhesive on the back surface of the membrane is covered with a strip of paper which protects the adhesive from contamination or accidentally becoming stuck to another surface. Prior to applying the plastic membrane overlay to a face plate, the strip of paper is peeled off and discarded. The back surface of the plastic membrane overlay is then positioned over the face of the module and firmly pressed into place. The terminal 66 at the end of the ribbon having the flexible conductors is then connected to a mating terminal of a shelf controller (not shown) which is connected to a bay controller. The bay controller, among other information, provides frame number and bay number information. The bay control is, in turn, connected to a master control (not shown). The plastic pressure switches 54 and associated LED's of the overlay plastic membrane 50 are positioned to be aligned with the optical fiber jacks 72. Thus, with this invention, the relatively expensive mechanical on-off push switches 42 and the LED's 44 which must be physically connected to the face plate and hardwired to a connector on the module are eliminated and, in their place, the more economical LED's 56 and plastic pressure switches 54 are used. In addition, with the inventive structure, if a plastic pressure switch 54 should become inoperative, or a conductor from the switch 54 should fail, the technician merely unplugs terminal 66, peels the plastic membrane 50 having the embedded LED's and switches off the face plate and replaces it with a new plastic membrane 50. Note, with this invention, the module does not have to be removed from the rack to replace a defective switch or a faulty conductive path and there is no interruption of service.

With this invention, a technician can perform all the functions and tests that are normally done with the prior art mechanical on-off switches and LED's such as adding, deleting and queuing patch cord ends and the like. It will be understood that the embodiment of the present invention specifically shown and described is merely exemplary and that a person skilled in the art can make alternate embodiments using different configurations and functionally equivalent components. All such alternate embodiments are intended to be included in the scope of this invention as set forth in the following claims.

The invention claimed is:

1. Structure for coupling to a module having a face and jacks thereon for receiving optical fiber patch cords, comprising:

a plastic membrane, fastening means comprising adhesive means coupled to a back surface of the plastic membrane for coupling the plastic membrane to the face of the module, an electrical component comprising a light emitting diode and a pressure switch embedded in the plastic membrane and positioned to be visually associated with a jack of the module when the membrane is coupled to a module, a connector, and a conductor supported by a flexible plastic ribbon for coupling the electrical component embedded in the plastic membrane to the connector.

2. The structure of claim 1 further comprising removable protective means coupled to protect the adhesive means on the back surface of the plastic membrane.

3. The structure of claim 1, wherein the adhesive means is adapted to removably secure the plastic membrane to the face of the module.

4. Structure for coupling to a module having a face and jacks thereon for receiving optical fiber patch cords, comprising:

a plastic membrane, fastening means for coupling the plastic membrane to the face of the module, an electrical component embedded in the plastic membrane positioned to be visually associated with a jack of the module when the membrane is coupled to a module wherein the electrical component comprises a light emitting diode and a pressure switch and the plastic membrane coupled to the face of the module and which supports the embedded component is a laminate comprised of a top plastic layer and a more rigid bottom plastic layer, a connector, a conductor coupling the electrical component embedded in the plastic membrane to the connector, and a flexible plastic ribbon for supporting the conductor.

5. The structure of claim 4, wherein the flexible plastic ribbon is configured to extend along a portion of one side of a module when the plastic membrane is adhered to the face of a module.

6. The structure of claim 5, wherein the flexible plastic ribbon is configured to extend between two modules when the plastic membrane is fastened to the face of a module.

* * * * *